United States Patent
Ganireddy et al.

(10) Patent No.: US 10,778,112 B2
(45) Date of Patent: Sep. 15, 2020

(54) DFIG CONVERTER WITH ACTIVE FILTER

(71) Applicant: General Electric Company, Schenectady, NY (US)

(72) Inventors: Govardhan Ganireddy, Roanoke, VA (US); Harold Robert Schnetzka, Simpsonville, SC (US); Robert Gregory Wagoner, Roanoke, VA (US); Amy Marlene Ridenour, Salem, VA (US); Kapil Jha, Bangalore (IN); Yashomani Y. Kolhatkar, Bangalore (IN); Arvind Kumar Tiwari, Bangalore (IN)

(73) Assignee: General Electric Company, Schenectady, NY (US)

(*) Notice: Subject to any disclaimer, the term of this patent is extended or adjusted under 35 U.S.C. 154(b) by 97 days.

(21) Appl. No.: 15/944,828

(22) Filed: Apr. 4, 2018

(65) Prior Publication Data
US 2019/0312502 A1  Oct. 10, 2019

(51) Int. Cl.
*H02M 5/458* (2006.01)
*H02P 9/00* (2006.01)
(Continued)

(52) U.S. Cl.
CPC .......... *H02M 5/4585* (2013.01); *F03D 9/255* (2017.02); *H02M 1/12* (2013.01); *H02M 1/126* (2013.01);
(Continued)

(58) Field of Classification Search
CPC .................. H02P 2101/15; H02P 9/007; F05B 2220/706; H02K 7/1838; F03D 9/255; H02M 1/126; H02M 5/4585; H02M 1/12
(Continued)

(56) References Cited

U.S. PATENT DOCUMENTS

| 3,593,106 A | 7/1971 | Lafuze |
| 4,281,371 A | 7/1981 | Baker |

(Continued)

FOREIGN PATENT DOCUMENTS

| CN | 107 332 484 A | 11/1917 |
| EP | 1276219 A1 | 1/2003 |

(Continued)

OTHER PUBLICATIONS

U.S. Appl. No. 15/587,670, filed May 5, 2017.
(Continued)

*Primary Examiner* — Charles Reid, Jr.
(74) *Attorney, Agent, or Firm* — Dority & Manning, P.A.

(57) ABSTRACT

An electrical power system connected to a power grid can include a generator having a stator and a rotor and a power converter. The stator is connected to the power grid via a stator power path. The power converter can include a line-side converter coupled to the power grid via a converter power path and a rotor-side converter coupled to a rotor bus of the rotor and the line-side converter via a DC link. The rotor-side converter is configured to convert a DC power on the DC link to an AC signal for the rotor bus. The power system can also include an active filter having one or more active controlled components. The active filter is coupled in parallel with the rotor-side converter to reduce harmonics of the electrical power system.

19 Claims, 13 Drawing Sheets

(51) Int. Cl.
| | |
|---|---|
| *F03D 9/25* | (2016.01) |
| *H02M 1/12* | (2006.01) |
| *H02M 7/493* | (2007.01) |
| *H02P 101/15* | (2016.01) |
| *H02K 7/18* | (2006.01) |
| *H02M 7/219* | (2006.01) |
| *H02M 1/00* | (2006.01) |
| *H02M 7/5387* | (2007.01) |
| *H02M 7/23* | (2006.01) |

(52) U.S. Cl.
CPC .............. *H02M 7/23* (2013.01); *H02M 7/493* (2013.01); *H02P 9/007* (2013.01); *F05B 2220/706* (2013.01); *H02K 7/1838* (2013.01); *H02M 7/53871* (2013.01); *H02M 2001/0054* (2013.01); *H02M 2007/2195* (2013.01); *H02P 2101/15* (2015.01)

(58) Field of Classification Search
USPC ...................................................... 290/44, 55
See application file for complete search history.

(56) References Cited

U.S. PATENT DOCUMENTS

| | | | |
|---|---|---|---|
| 5,047,910 A | 9/1991 | Levran et al. | |
| 5,499,178 A * | 3/1996 | Mohan | H02J 3/01 307/105 |
| 5,737,198 A * | 4/1998 | Larsen | H02J 3/01 307/105 |
| 5,757,099 A * | 5/1998 | Cheng | H02J 3/01 307/105 |
| 5,910,889 A * | 6/1999 | Larsen | H02J 3/01 307/105 |
| 7,175,389 B2 | 2/2007 | Moroz | |
| 7,187,566 B2 | 3/2007 | Kawashima et al. | |
| 7,212,421 B2 | 5/2007 | Chandra et al. | |
| 7,281,891 B2 | 10/2007 | Smith et al. | |
| 7,342,323 B2 | 3/2008 | Avagliano et al. | |
| 7,346,462 B2 | 3/2008 | Delmerico | |
| 7,505,833 B2 | 3/2009 | Delmerico et al. | |
| 7,521,907 B2 | 4/2009 | Cervera et al. | |
| 7,613,548 B2 | 11/2009 | Cardinal et al. | |
| 7,822,560 B2 | 10/2010 | LeMieux | |
| 7,861,583 B2 | 1/2011 | Honhoff et al. | |
| 7,942,629 B2 | 5/2011 | Shi et al. | |
| 7,979,167 B2 | 7/2011 | Delmerico et al. | |
| 8,013,580 B2 | 9/2011 | Cervera et al. | |
| 8,025,476 B2 | 9/2011 | Zheng et al. | |
| 8,050,887 B2 | 11/2011 | Ahmann | |
| 8,257,040 B2 | 9/2012 | Chen et al. | |
| 8,736,241 B2 | 5/2014 | Cervera et al. | |
| 9,217,416 B2 | 12/2015 | Spruce et al. | |
| 9,605,558 B2 | 3/2017 | Perley et al. | |
| 10,340,829 B2 * | 7/2019 | Schnetzka | |
| 2005/0057949 A1 * | 3/2005 | Kim | H02J 3/01 363/37 |
| 2007/0014132 A1 * | 1/2007 | Wang | H02J 3/01 363/37 |
| 2007/0075546 A1 | 4/2007 | Avagliano et al. | |
| 2007/0132248 A1 * | 6/2007 | Weng | H02P 9/006 290/44 |
| 2008/0086281 A1 | 4/2008 | Santos | |
| 2009/0047116 A1 | 2/2009 | Barbu et al. | |
| 2009/0322081 A1 * | 12/2009 | Wagoner | H02M 7/493 290/44 |
| 2009/0322082 A1 * | 12/2009 | Wagoner | H02M 5/458 290/44 |
| 2009/0322083 A1 * | 12/2009 | Wagoner | H02J 3/38 290/44 |
| 2010/0118568 A1 * | 5/2010 | Helle | H02M 1/12 363/34 |
| 2011/0057517 A1 * | 3/2011 | Zhang | H02J 3/01 307/105 |
| 2011/0140431 A1 | 6/2011 | Landa et al. | |
| 2011/0266665 A1 * | 11/2011 | Gowda | H01L 23/48 257/691 |
| 2012/0128488 A1 | 5/2012 | Kristoffersen | |
| 2012/0263601 A1 | 10/2012 | Baker et al. | |
| 2013/0033040 A1 | 2/2013 | Bowyer et al. | |
| 2013/0107601 A1 * | 5/2013 | Wagoner | H02M 7/003 363/141 |
| 2013/0155732 A1 * | 6/2013 | Wagoner | H02J 3/01 363/40 |
| 2013/0156577 A1 | 6/2013 | Esbensen et al. | |
| 2013/0204447 A1 | 8/2013 | Bjerge et al. | |
| 2013/0286692 A1 | 10/2013 | Patel et al. | |
| 2013/0289911 A1 | 10/2013 | Patel et al. | |
| 2013/0297085 A1 | 11/2013 | Xiongzhe et al. | |
| 2014/0008912 A1 * | 1/2014 | Gupta | H02J 3/386 290/44 |
| 2014/0035285 A1 | 2/2014 | Creaby et al. | |
| 2014/0037447 A1 | 2/2014 | Attia | |
| 2014/0049859 A1 * | 2/2014 | Wagoner | H02J 3/00 361/18 |
| 2014/0062425 A1 * | 3/2014 | Harbourt | H02P 9/007 322/32 |
| 2014/0152331 A1 * | 6/2014 | Wagoner | G01R 27/16 324/705 |
| 2014/0253058 A1 | 9/2014 | Cervera et al. | |
| 2014/0268926 A1 * | 9/2014 | Gupta | H02M 5/44 363/35 |
| 2014/0320056 A1 | 10/2014 | Royak et al. | |
| 2015/0073610 A1 * | 3/2015 | Schnetzka | G05B 15/02 700/287 |
| 2015/0145251 A1 * | 5/2015 | Wagoner | F03D 7/0272 290/44 |
| 2015/0180273 A1 * | 6/2015 | Wagoner | H02M 1/12 290/50 |
| 2016/0128231 A1 * | 5/2016 | Wagoner | H05K 7/203 165/104.31 |
| 2016/0329714 A1 * | 11/2016 | Li | H02M 7/44 |
| 2017/0257046 A1 * | 9/2017 | Schnetzka | H02P 9/42 |
| 2019/0101101 A1 * | 4/2019 | Dharmadhikari | F03D 17/00 |
| 2019/0140569 A1 * | 5/2019 | Schnetzka | H02M 5/4585 |

FOREIGN PATENT DOCUMENTS

| | | |
|---|---|---|
| EP | 2302206 A | 3/2011 |
| WO | WO2009/138808 A1 | 11/2009 |
| WO | WO2013/083130 A1 | 6/2013 |
| WO | WO2016/078669 A1 | 5/2016 |

OTHER PUBLICATIONS

Article 1—Vinod. S. Tejwani et al., "Power Electronic Converter for Wind Power Plant", Computing, Electronics and Electrical Technologies (ICCEET), 2012 International Conference on, IEEE, Mar. 21, 21, pp. 413-423.

Article 2—Revere Luca et al.—"IGBT—Sic dual fed open end winding PMSM drrive", 2007 IEEE International Electric Machines and Drives Conference (IEMDC), IEEE, May 21, 2017, pp. 107.

PCT Search Report, dated Jul. 5, 2019.

* cited by examiner

DFIG CONVERTER WITH ACTIVE FILTER

FIELD

The present disclosure relates generally to electrical power systems for providing power to a power grid from, for example, wind turbines.

BACKGROUND

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor-side converter and a line-side converter. The rotor-side converter can receive alternating current (AC) power from the rotor via a rotor-side bus and can convert the AC power to a DC power. The line-side converter can then convert the DC power to AC power having a suitable output frequency, such as the grid frequency. The AC power is provided to the electrical grid via a line-side bus.

BRIEF DESCRIPTION

Aspects and advantages of embodiments of the present disclosure will be set forth in part in the following description, or may be learned from the description, or may be learned through practice of the embodiments.

One example aspect of the present disclosure is directed to an electrical power system. The system can include a generator having a stator and a rotor. The stator can be connected to the power grid via a stator power path. The system can include a power converter. The power converter can include a line-side converter coupled to the power grid via a converter power path. The power converter can include a rotor-side converter coupled to a rotor bus of the rotor and the line-side converter via a DC link. The rotor-side converter can be configured to convert a DC power on the DC link to an AC signal for the rotor bus. The power system can also include an active filter comprising one or more active controlled components. The active filter can be coupled in parallel with the rotor side converter to reduce harmonics of the electrical power system.

Other example aspects of the present disclosure can include apparatus, systems, methods, control systems, and other technology for converter modulation and/or overmodulation.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
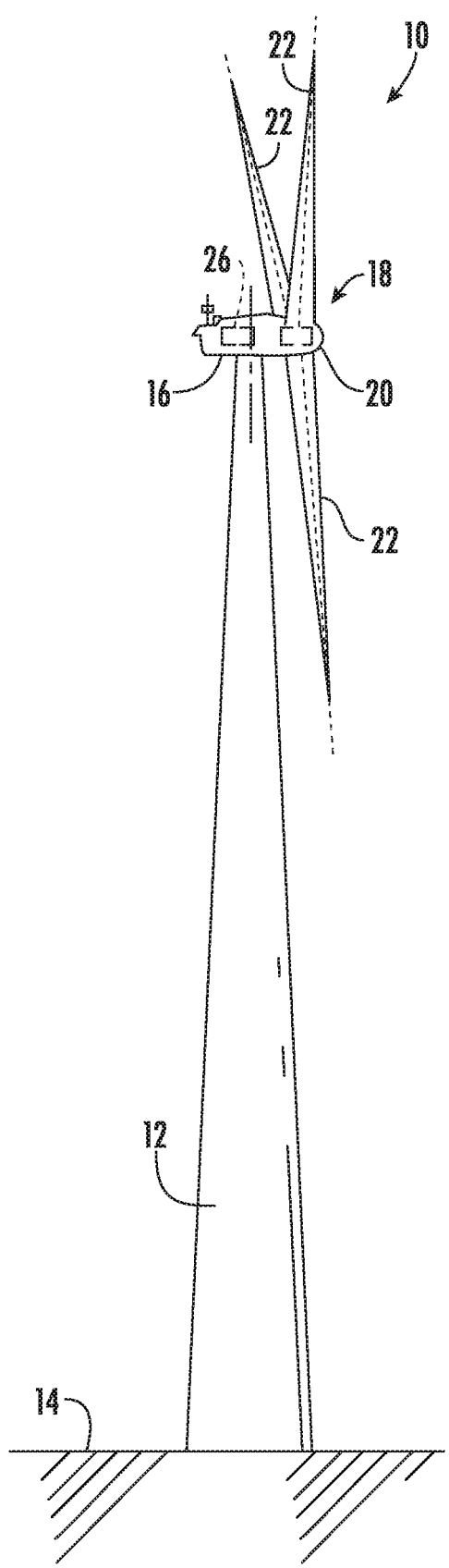
FIG. 1 is a perspective view of a wind turbine according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for operating a power converter in a doubly-fed induction generator (DFIG) system. A DFIG system can include a power converter having a line-side converter and a rotor-side converter. A DC link can be coupled between the line-side converter and the rotor-side converter. The power converter can convert an AC power from a stator of the DFIG to a DC power for the DC link using the line-side converter. The power converter can convert the DC power on the DC link to an AC signal for the rotor of the DFIG using the rotor-side converter. For instance, the AC signal can be provided on a rotor bus coupled between the rotor-side converter and the rotor of the DFIG. The AC signal can be used to, for example, control operating characteristics of the DFIG. The DFIG system can also include an active filter comprising active controlled components (e.g., switching elements insulated gate bipolar transistors IGBTs, insulated gate commuted thyristors, MOSFETs (e.g. Silicon or Silicon Carbide based MOSFETs), bipolar transistors, silicon controlled rectifiers, or other suitable switching elements). The active filter can be coupled in parallel with the rotor side converter to reduce harmonics of the DFIG system.

The rotor-side converter can include one or more switching elements. The switching elements can be, in some embodiments, any variety of suitable switching elements, such as insulated gate bipolar transistors IGBTs, insulated gate commuted thyristors, MOSFETs (e.g. Silicon or Silicon Carbide based MOSFETs), bipolar transistors, silicon controlled rectifiers, or other suitable switching elements. The switching elements can be controlled to convert a DC signal on the DC link to an AC signal for the rotor of the DFIG, using, for instance, pulse width modulation.

The power converter can generate harmonics in the power system. As an example, in some embodiments, the switching elements can be controlled according to an overmodulation regime to produce the AC signal on the rotor-side converter.

For instance, modulation of the switching elements can be achieved by comparing a modulating wave to a carrier wave and modulating the switching elements based on that comparison. For example, the switching elements can be toggled whenever the carrier wave and modulating wave intersect. In an overmodulation regime, the maximum amplitude of the modulating wave is greater than the maximum amplitude of the carrier wave. This can result in some pulses of the carrier wave not being intersected by the modulating wave. In some embodiments, the modulating wave can be a periodic, constant-amplitude sinusoidal signal and the carrier wave can be a periodic triangle wave, but other suitable waveforms for both the modulating and carrier waves can be used in accordance with the present disclosure, such as sinusoidal waves, symmetric triangle waves, asymmetric triangle waves including sawtooth waves, square waves, quasi-square waves, and other suitable waveforms.

In some embodiments, the rotor-side converter can be operated in an overmodulation regime such that the output of the rotor-side converter is a quasi-square wave AC signal. For instance, a line-to-line voltage waveform at the rotor can be a six-step quasi-square wave having a region of low voltage and a region of high voltage with a region of intermediate voltage, such as a reference or zero voltage, in between the region of low voltage and the region of high voltage.

Operating the rotor-side converter in an overmodulation regime can have several advantages. For instance, in some embodiments, the voltage gain from the DC link to the rotor can be increased relative to a non-overmodulated regime. In some embodiments, this can contribute to an increased RPM operating range of the generator. Additionally, operating the rotor-side converter in an overmodulation regime can result in a decrease in the switching frequency of the switching elements. This can reduce energy lost during modulation of the switching elements, and can additionally reduce wear and/or allow higher currents on the switching elements. Other advantages may include extended higher limit of the continuous operating grid voltage, improved controllability and/or reduced stress during transient grid voltages and/or high-voltage-ride-through (HVRT), extended overspeed limits for a wind turbine system, lower DC Link regulation by the line-side converter during low grid voltage conditions, and/or higher generator speeds. However, according to some embodiments, the rotor-side converter can be operated outside of an overmodulation regime or close to an overmodulation regime. In these instances, some of the above advantages are still applicable.

Operating the rotor-side converter in an overmodulation regime can contribute to increased harmonics in the generator. In some instances, the increased harmonics can propagate to other elements in the power system, such as a connected power grid. Additionally, the harmonics with the largest increase can have similar frequencies to the fundamental frequency (i.e. the power output of the generator), such as the third, fifth, seventh, or other lower-order harmonics. Filtering these harmonics is typically more difficult than higher-order harmonics (e.g., the fiftieth harmonic) due to their magnitude and/or closeness to the fundamental frequency.

In some embodiments, a filter, such as an active filter can be provided to counteract or reduce the harmonic contributions from operating the rotor-side converter in the overmodulation regime, close to the overmodulation regime, or outside of the overmodulation regime. The active filter can include active controlled components, and may, in some embodiments, only be activated whenever harmonic contributions in the system do not satisfy a threshold, such as an industry standard, for example, to conserve resources within the system and/or prevent wear on the active filter. For instance, it may be possible to activate the active filter when the lower-order harmonics exceed grid requirements. For example, the active filter can provide current or voltage at the same frequency as a harmonic but at opposite phase to near-entirely or entirely cancel the harmonic.

The active filter can be coupled to the rotor bus within the electric power system. For instance, the active filter can be coupled to the rotor bus at an electrical line between the rotor-side converter and the rotor. The active filter can also be directly coupled to terminals of the rotor-side converter. The active filter can also be coupled in parallel to the rotor-side converter. The active filter can also be coupled to a transformer that is coupled to the electrical line between the rotor-side converter and the rotor. Accordingly, the active filter allows filtering of harmonics prior to injection into the DFIG generator. Furthermore, in addition to reducing the harmonics on the stator power path, the active filter also aids in reducing thermal loading on the generator resulting from harmonic currents. Moreover, placement of the active filter at the rotor-side converter allows for closed-loop control for injecting the harmonic current based on current or voltage sensing of the rotor bridge or rotor winding, further reducing thermal loading on the generator.

Referring now to the figures, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy and, subsequently, electrical energy. For instance, the hub 20 may be rotatably coupled to an electric generator 120 of FIG. 2 positioned within the nacelle 16 to permit electrical energy to be produced. The wind turbine 10 may further include a turbine controller 26 utilized to control yaw adjustment of the wind turbine 10, pitch adjustment of the rotor blades 22, and/or torque adjustment of the generator 120 of FIG. 2. The turbine controller 26 may interface with components within the wind turbine 10, such as the converter controller 140 of FIG. 2.

Figure 2:
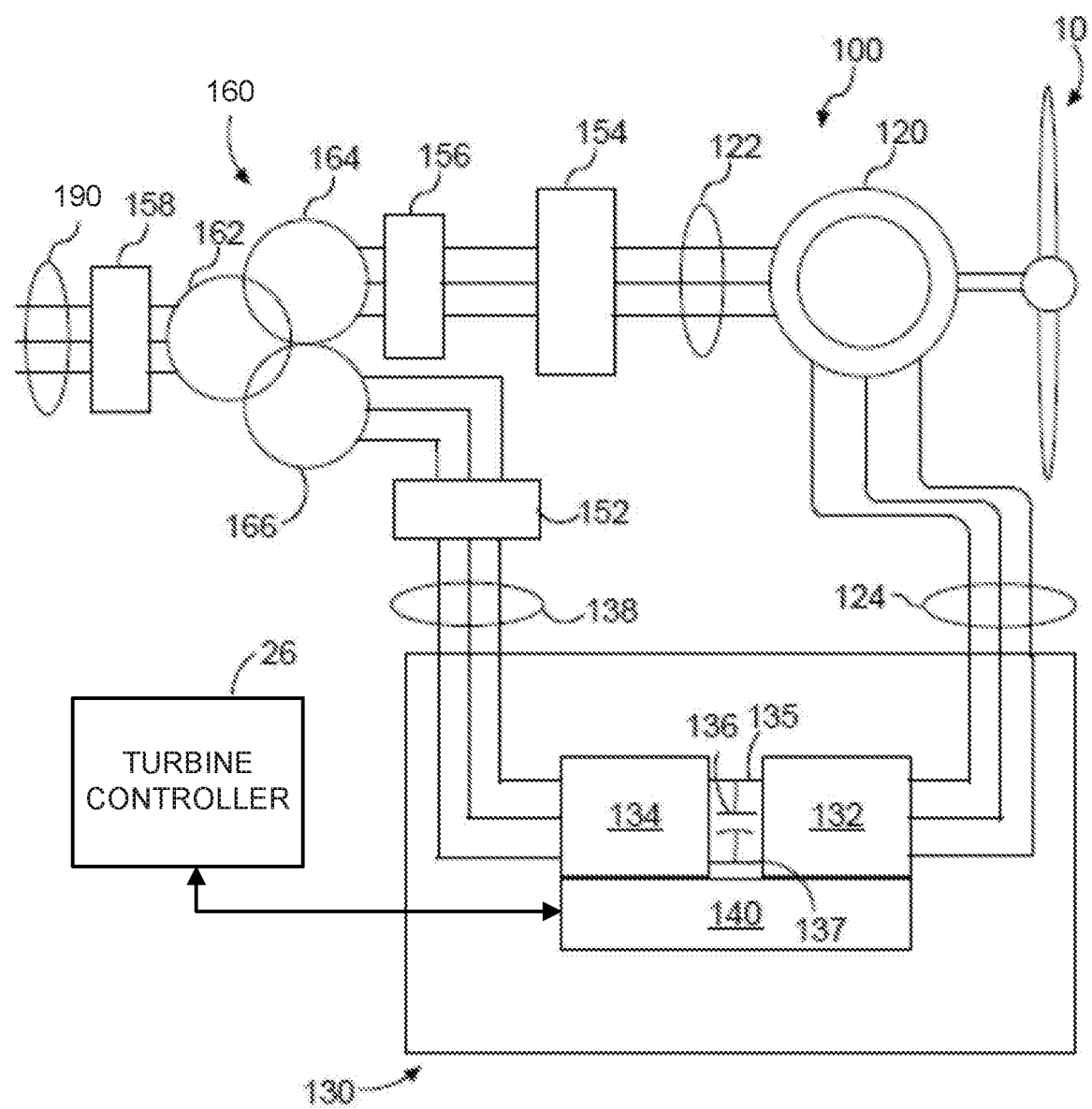
FIG. 2 illustrates an electrical power system according to example embodiments of the present disclosure.

Referring now to FIG. 2, a schematic diagram of one embodiment of a DFIG wind turbine system 100 is illustrated in accordance with aspects of the present subject matter. It should be appreciated that the present subject matter will generally be described herein with reference to the system 100 shown in FIG. 2. However, those of ordinary skill in the art, using the disclosures provided herein, should understand that aspects of the present disclosure may also be applicable in other power generation systems.

As shown, a generator 120, e.g. a DFIG 120, can be coupled to a stator bus 122 and a power converter 130 via a rotor-side bus 124. The stator bus 122 can provide an output multiphase power (e.g. three-phase power) from a stator of DFIG 120 and the rotor-side bus 124 can provide an output multiphase power (e.g. three-phase power) of the rotor of DFIG 120. The power converter 130 can have a rotor-side converter 132 and a line-side converter 134. The DFIG 120 can be coupled via the rotor-side bus 124 to the rotor-side converter 132. The rotor-side converter 132 can be coupled to the line-side converter 134 which in turn can be coupled to a line-side bus 138. The rotor-side converter 132 and the line-side converter 134 can be coupled via a DC link 135, 137 across which is the DC link capacitor 136.

In addition, the power converter 130 may be coupled to a converter controller 140 in order to control the operation of the rotor-side converter 132 and the line-side converter 134. For instance, the converter controller 140 may be configured to operate the rotor-side converter 132 in an overmodulation regime, or close to an overmodulation regime. The converter controller 140 may include any number of control devices. In one embodiment, the control devices may include a processing device (e.g. microprocessor, microcontroller, etc.) executing computer-readable instructions stored in a computer-readable medium. The instructions, when executed by the processing device, may cause the processing device to perform operations, including providing control commands (e.g. switching frequency commands) to the switching elements 142 of the power converter 130. For instance, the instructions may include providing control commands to the switching elements 142 of FIG. 4 of the rotor-side converter 132 to operate the rotor-side converter 132 (e.g. by the switching elements 142) in an overmodulation regime or close to an overmodulation regime.

As illustrated, the system 100 may include a transformer 160 coupling the wind turbine system 100 to an electrical grid 190. The transformer 160 may be a three-winding transformer that can include a high voltage (e.g. greater than 12 KVAC) primary winding 162 e.g. coupled to the electrical grid, a medium voltage (e.g. 6 KVAC) secondary winding 164 e.g. coupled to the stator bus 122, and/or a low voltage (e.g. 575 VAC, 690 VAC, etc.) auxiliary winding 166 e.g. coupled to the line-side bus 138. It should be understood that the transformer 160 can be a three-winding transformer as shown, or alternatively may be a two-winding transformer having only a primary winding 162 and a secondary winding 164; may be a four-winding transformer having a primary winding 162, a secondary winding 164, an auxiliary winding 166, and an additional auxiliary winding; or may have any other suitable number of windings.

On the stator bus 122, sinusoidal multi-phase (e.g. three-phase) alternating current (AC) power can be provided from the stator of the generator 120 to the stator bus 122, and from the stator bus 122 to the transformer 160, e.g. to the secondary winding 164 thereof. Various circuit breakers, fuses, contactors, and other devices, such as grid circuit breaker 158, stator bus circuit breaker 156, switch 154, and line-side bus circuit breaker 152, can be included in the system 100 to connect or disconnect corresponding buses, for example, when current flow is excessive and can damage components of the wind turbine system 100 or for other operational considerations. Additional protection components can also be included in the wind turbine system 100.

Figure 3:
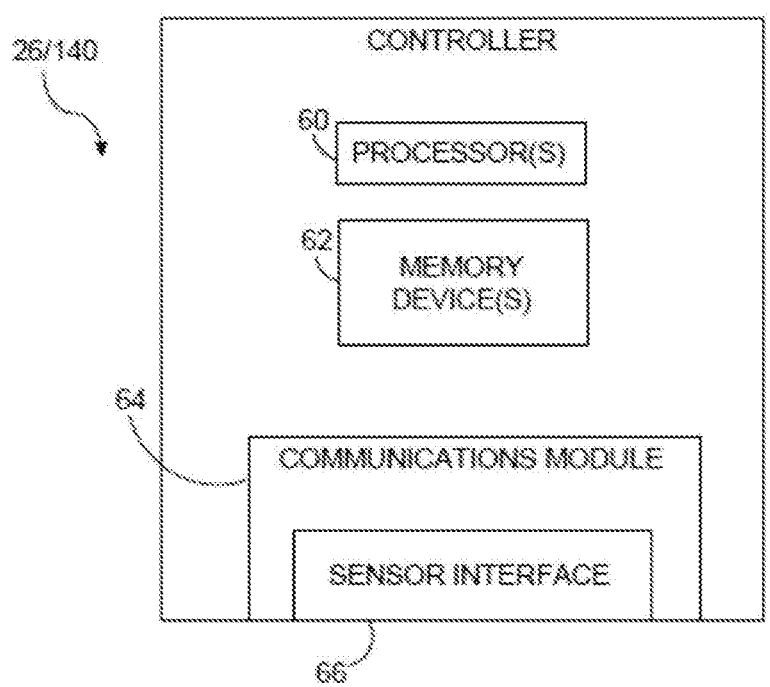
FIG. 3 illustrates a schematic diagram of suitable components that may be included within a controller of a wind turbine and/or electrical power system and/or a controller of a power converter according to example embodiments of the present disclosure.

Referring now to FIG. 3, there is illustrated a block diagram of one embodiment of suitable components (e.g., one or more control devices) that may be included within the turbine controller 26 and/or the converter controller 140 in accordance with aspects of the present subject matter. As shown, the controller 26/140 may include one or more processor(s) 60 and associated memory device(s) 62 configured to perform a variety of computer-implemented functions (e.g., performing the methods, steps, calculations and the like disclosed herein). Additionally, the controller 26/140 may also include a communications module 64 to facilitate communications between the controller 26/140 and the various components of the wind turbine 10. For instance, the communications module 64 may serve as an interface to permit the turbine controller 26 to transmit control signals to one or more pitch adjustment mechanisms to, for instance, control the pitch of the rotor blades 22. The communications module 64 may additionally and/or alternatively serve as an interface to permit the turbine controller 26 to transmit signals (e.g. control signals or status signals) to the converter controller 140. The communications module 64 may additionally and/or alternatively serve to permit the converter controller 140 to provide control signals to the power converter 130. Moreover, the communications module 64 may include a sensor interface 66 (e.g., one or more analog-to-digital converters) to permit input signals transmitted from, for example, various sensors such as voltage sensors and current sensors, to be converted into signals that can be understood and processed by the processors 60.

Figure 4:
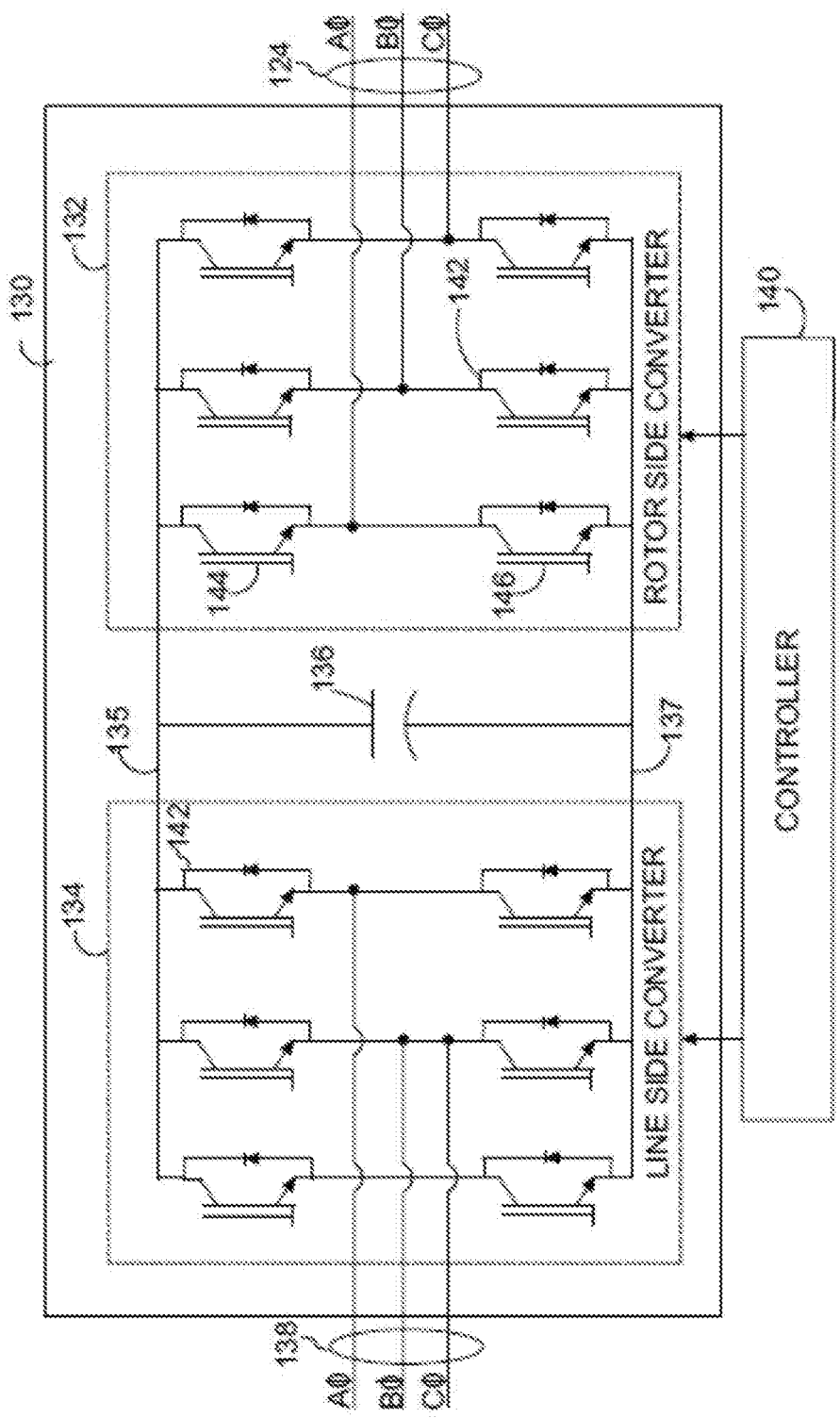
FIG. 4 illustrates a schematic diagram of an example power converter suitable for use with the wind turbine system according to example embodiments of the present disclosure.

Referring now to FIG. 4, a schematic diagram of an example embodiment of the power converter 130 shown in FIG. 2 is illustrated in accordance with aspects of the present subject matter. As shown, the rotor-side converter 132 includes a plurality of bridge circuits, with each phase of the rotor-side bus 124 input to the rotor-side converter 132 being coupled to a single bridge circuit. In addition, the line-side converter 134 may also include a plurality of bridge circuits. Similar to the rotor-side converter 132, the line-side converter 134 also includes a single bridge circuit for each output phase of the line-side converter 134. In other embodiments, the line-side converter 134, the rotor-side converter 132, or both the line-side converter 134 and the rotor-side converter 132 may include parallel bridge circuits without deviating from the scope of the present disclosure.

Each bridge circuit may generally include a plurality of switching elements (e.g. IGBTs) 142 coupled in series with one another. For instance, as shown in FIG. 4, each bridge circuit includes an upper switching element 144 and a lower switching element 146. In addition, a diode may be coupled in parallel with each of the switching elements 142. In alternative embodiments, parallel switching elements 142 and diodes may be used to increase the current rating of the converter. As is generally understood, the line-side converter 134 and the rotor-side converter 132 may be controlled, for instance, by providing control commands, using a suitable driver circuit, to the gates of the switching elements 142. For example, the converter controller 140 may provide suitable gate timing commands to the gates of the switching elements 142 of the bridge circuits. The control commands may control the switching frequency of the switching elements 142 to provide a desired output. It should be appreciated by those of ordinary skill in the art that the power converter 130 may include any suitable switching elements 142, such as insulated gate bipolar transistors (IGBTs), insulated gate commuted thyristors, MOSFETs (e.g. Silicon or Silicon Carbide based MOSFETs), bipolar transistors, silicon controlled rectifiers, or other suitable switching elements.

Figure 5:
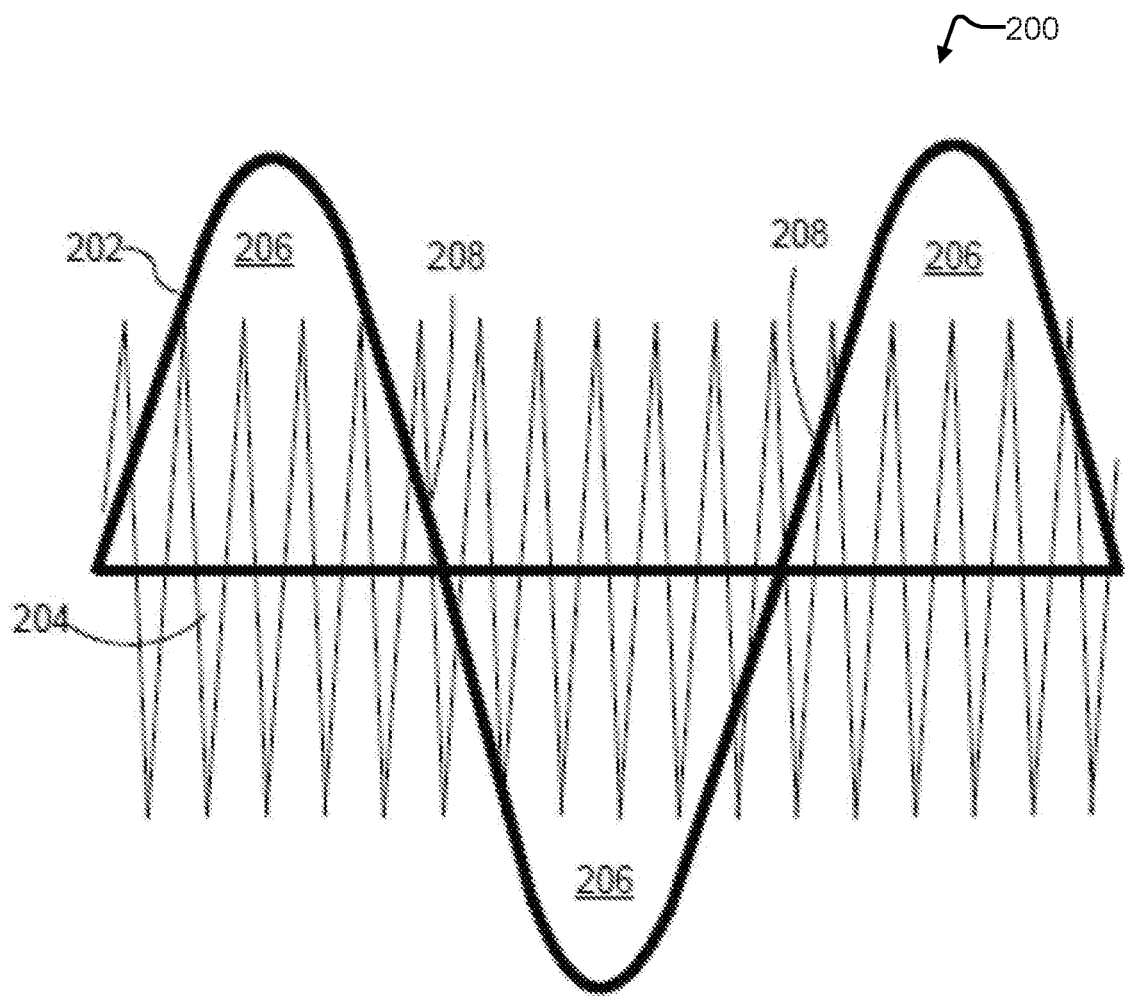
FIG. 5 illustrates an example overmodulation regime used to control one or more control devices according to example embodiments of the present disclosure.

FIG. 5 illustrates a graphical representation of an example overmodulation regime 200 used to control switching devices within a power converter according to example embodiments of the present disclosure. Those skilled in the art, using the disclosures provided herein, will understand that a variety of suitable overmodulation regimes and/or configurations may be used without departing from the scope or spirit of the present disclosure. Furthermore, as stated above, other modulating regimes including close to overmodulation regimes may be used, as well.

According to the overmodulation regime 200, a modulating wave 202 is compared to a carrier wave 204. The modulating wave 202 is illustrated as a constant amplitude, constant frequency sinusoidal signal, but may be any of a variety of suitable waveforms including sinusoidal waves, sinusoidal waves with harmonic additions, square waves, quasi-square waves, and other suitable waveforms. The carrier wave 204 is illustrated as a constant amplitude, constant frequency symmetric triangle wave but may be any of a variety of suitable waveforms including sinusoidal waves, symmetric triangle waves, asymmetric triangle waves including sawtooth waves, square waves, quasi-square waves, and other suitable waveforms. In addition, the frequency and/or the amplitude of the modulating wave 202 and/or the carrier wave 204 may be varied as a function of time.

Switching elements (e.g. switching elements 142) can be controlled based on the overmodulation regime 200. For instance, the switching elements (e.g. switching elements 142) can be toggled, e.g. by sending control signals from a controller (e.g. converter controller 140) to bias voltage across the gates of the switching elements 142, whenever modulating wave 202 and carrier wave 204 intersect, e.g. at intersections 208. The modulating wave 202 may correspond to only one switching device or may correspond to several switching elements. A plurality of modulating waves 202 and/or carrier waves 204 may be provided. For example, a plurality of modulating waves 202 may be compared to a single carrier wave 204 wherein each modulating wave 202 in the plurality of modulating waves 202 corresponds to one or more switching elements. The plurality of modulating waves 202 may be in phase or out of phase (e.g. out of phase by 60 degrees, 120 degrees, 180 degrees, etc.). Alternatively, multiple pairs of modulating waves 202 and carrier waves 204 may be provided wherein each pair of modulating waves 202 and carrier waves 204 corresponds to one or more switching elements. Other suitable control schemes may be used, e.g. based on the configuration and/or type of switching elements.

The amplitude of the modulating wave 202 can be larger than the amplitude of the carrier wave 204, resulting in overmodulation regions 206 wherein the modulating wave 202 does not intersect the carrier wave 204. Generally, the larger the difference in amplitude between the modulating wave 202 and carrier wave 204, the larger the overmodulation region 206. For instance, if the difference in amplitude between the modulating wave 202 and carrier wave 204 is large enough, the modulating wave 202 may intersect the carrier wave 204 only twice during one period of the modulating wave 202. Similarly, in a regime close to an overmodulation regime, the regions 206 may be minimized so as to be close to unity with the carrier wave 204. In these instances, the modulation regime can be referred to as close to an overmodulation regime.

Figure 6:
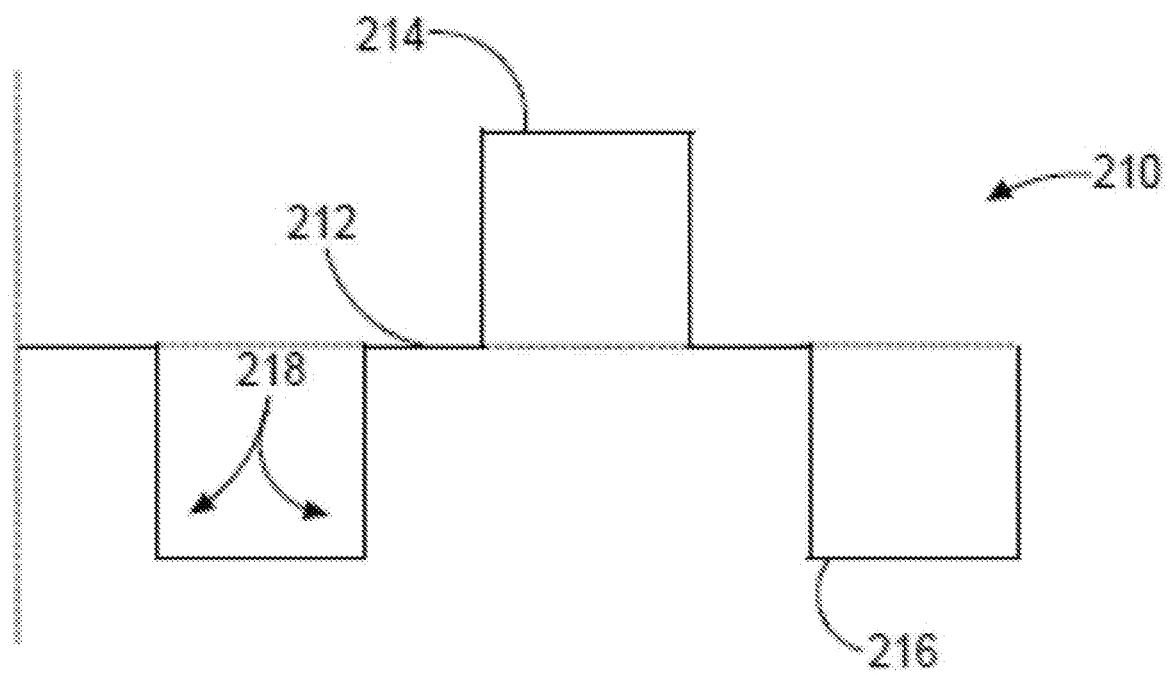
FIG. 6 illustrates an example quasi-square wave signal that can be provided to a rotor in accordance with example embodiments of the present disclosure.

Switching devices (e.g. switching devices 142) can be controlled in accordance with an overmodulation regime (e.g. overmodulation regime 200) to produce a time-varying AC signal. The time-varying AC signal can be, for instance, the quasi-square wave 210 shown in FIG. 6. The quasi-square wave 210 may be a line-to-line voltage between two lines in an AC bus, such as rotor-side bus 124. The quasi-square wave 210 may represent other configurations as well. As can be seen in FIG. 6, the quasi-square wave 210 has a region of intermediate voltage 212 between a region of high voltage 214 and a region of low voltage 216. The region of intermediate voltage 212 may be at zero volts, or may be at some non-zero reference voltage. The edges 218 may correspond to toggling of switching elements. The edges 218 are shown to be ideal, i.e. instantaneous, but those skilled in the art, using the disclosures provided herein, will understand that the edges 218 may be slightly uneven or diagonal.

Figure 7:
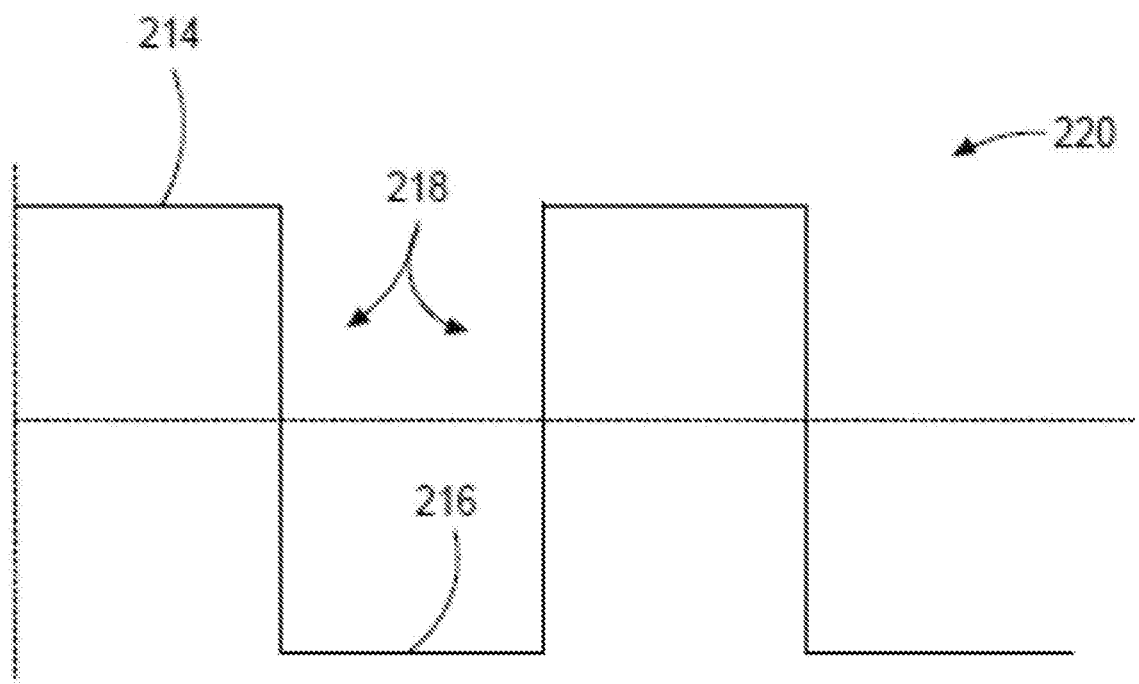
FIG. 7 illustrates an example square wave signal that can be provided to a rotor in accordance with example embodiments of the present disclosure.

The time-varying AC signal produced from an overmodulation regime (e.g. overmodulation regime 200) if viewed from the power converter line to a reference such as the negative DC link (137 of FIG. 4) can be the square wave 220 shown in FIG. 7. The square wave 220 may be a line-to-refence voltage between a line in an AC bus, such as rotor-side bus 124, and a reference, such as the negative side 137 of DC link 135. The square wave 220 may represent other configurations as well. As can be seen in FIG. 7, the square wave 220 has edges 218 directly between regions of high voltage 214 and regions of low voltage 216 (i.e. without a region of intermediate voltage 212). The edges 218 may correspond to toggling of switching elements. The edges 218 are shown to be ideal, i.e. instantaneous, but those skilled in the art, using the disclosures provided herein, will understand that the edges 218 may be slightly uneven or diagonal.

Figure 8:
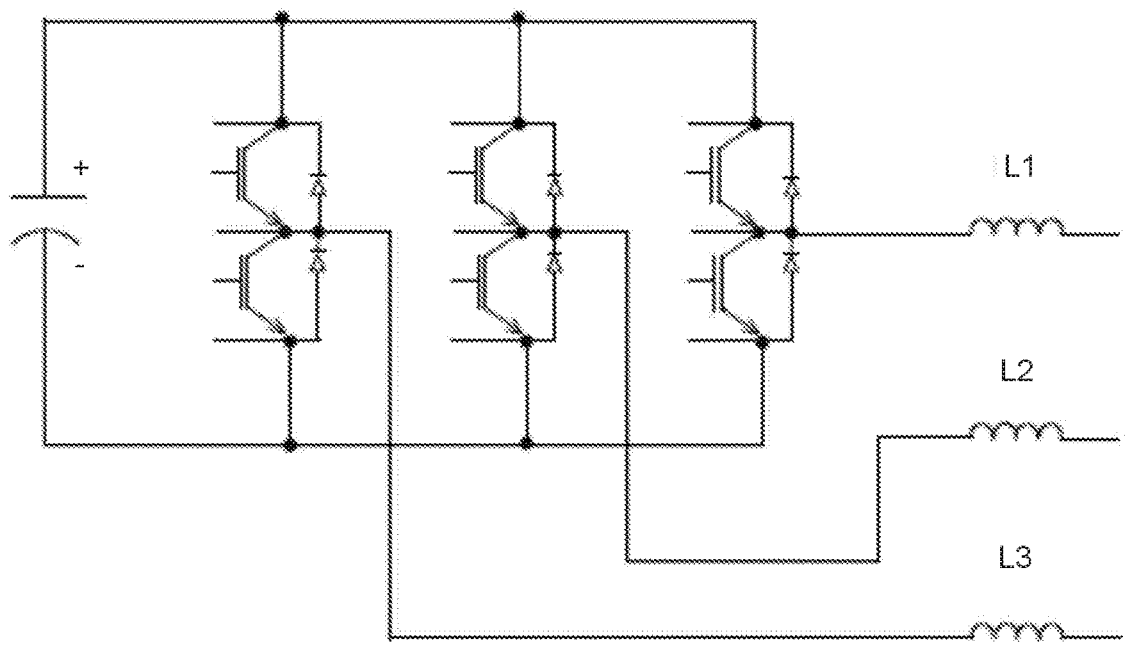
FIG. 8 illustrates an example active filter suitable for use with a wind turbine system according to example embodiments of the present disclosure.

As described in detail herein, an active filter, such as parallel active filter 250 illustrated in FIG. 8, may be provided in an electrical power system (e.g. electrical power system 100) to reduce or cancel harmonics caused by operating a rotor-side converter in an overmodulation regime or close to an overmodulation regime (e.g., rotor-side converter 132). For instance, the active filter 250 may reduce or cancel harmonics to satisfy one or more grid requirements for harmonics. The active filter 250 may provide current at about the same frequency and/or amplitude as the harmonics and at an opposite phase, i.e. about 180 degrees out of phase. The active filter 250 can provide this power with a high degree of precision to cancel harmonics, even harmonics close to the fundamental frequency, with reduced or no impact on the power at the fundamental frequency. The active filter 250 (e.g., a parallel active filter 250) may take at least a portion of one or more currents from the system (e.g., a portion of the fundamental current on a bus) as input to offset losses associated with operation of the active filter 250. Other suitable active filters may be used without departing from the scope or spirit of the present disclosure.

Figure 9:
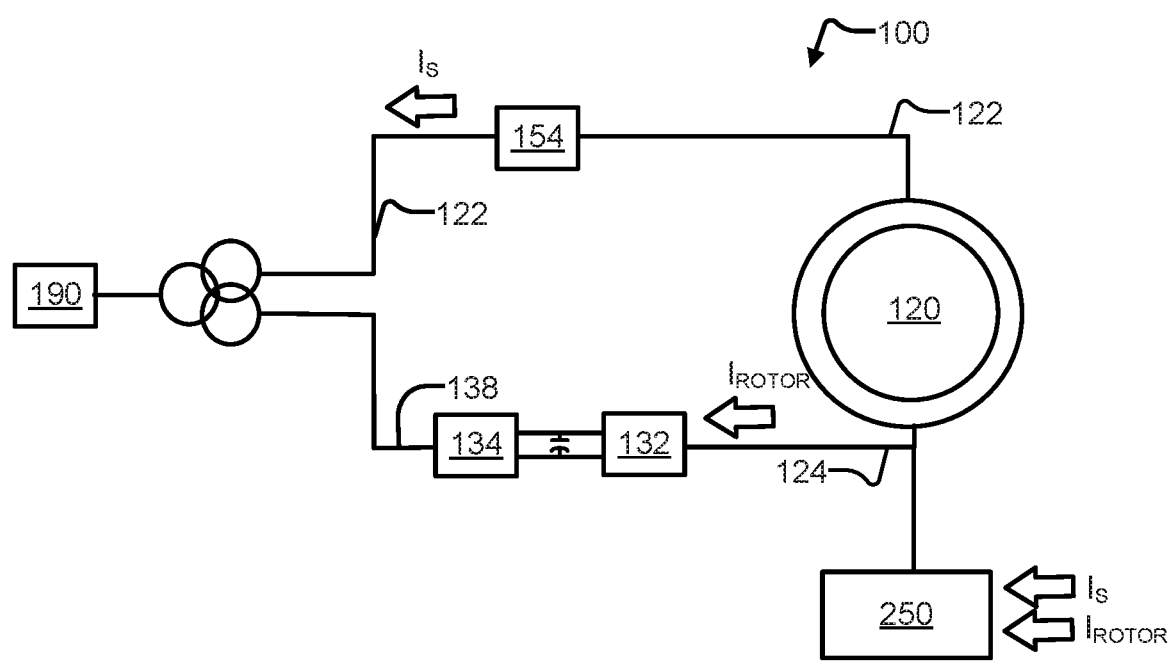
FIG. 9 illustrates an example electrical power system including an active filter according to example embodiments of the present disclosure.
Figure 10:
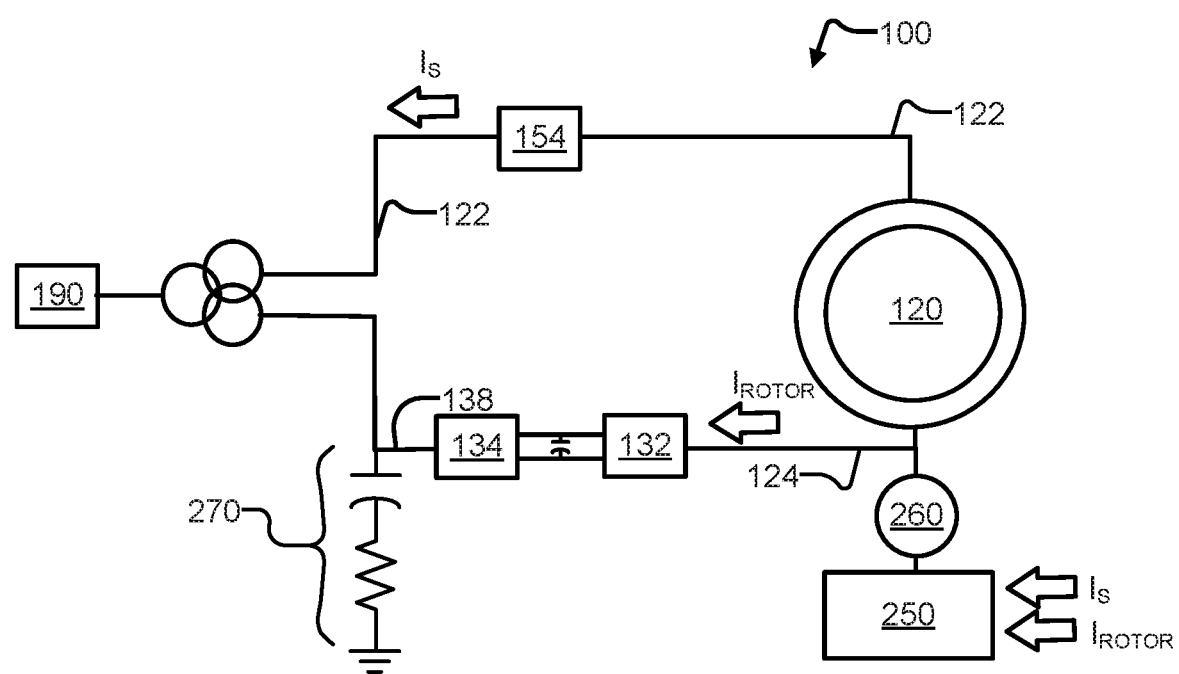
FIG. 10 illustrates an additional example electrical power system including an active filter according to example embodiments of the present disclosure.
Figure 11:
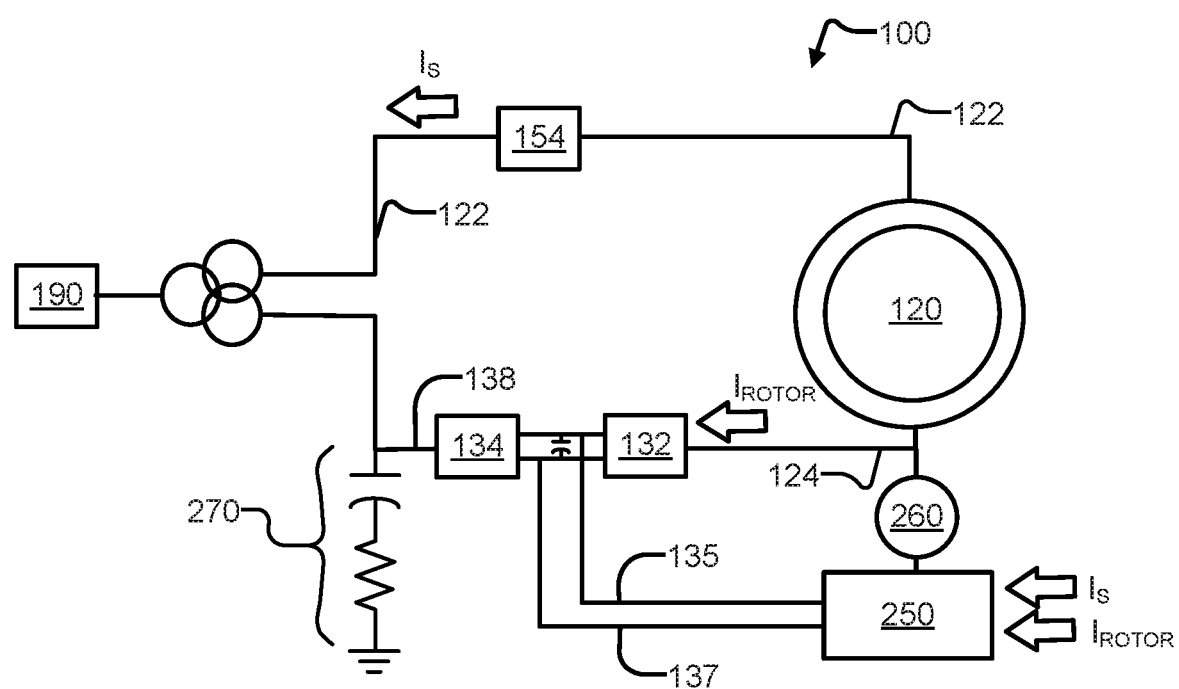
FIG. 11 illustrates an additional example electrical power system including an active filter according to example embodiments of the present disclosure.

Referring now to FIGS. 9-11, example implementations of an active filter used to reduce harmonics, such as harmonics caused by operating a rotor-side converter in an overmodulation regime or close to an overmodulation regime, are illustrated. A simplified version of the electrical power system shown in FIG. 2 is used for the purpose of illustration. Components illustrated in FIG. 2 that are not illustrated in FIGS. 9-11, along with other suitable components, may still be present in embodiments of the present disclosure.

For instance, as shown in FIGS. 9-11, the active filter 250 can be coupled to the rotor bus 124, i.e. between the power converter 130 and generator 120. The active filter may take as input $I_s$, i.e. the current on the stator bus 122, and/or $I_{ROTOR}$, i.e. the current on the rotor-side bus 124. In some embodiments, such as the embodiment shown in FIG. 9, the active filter 250 can be directly coupled to terminals of the rotor-side converter 132. The active filter 250 can also be directly coupled to the rotor-side bus 124. In some embodiments, such as the embodiment shown in FIG. 10, a transformer 260, e.g. a dual-winding transformer 260, may be provided between the active filter 250 and the rotor-side bus 124.

Figure 12:
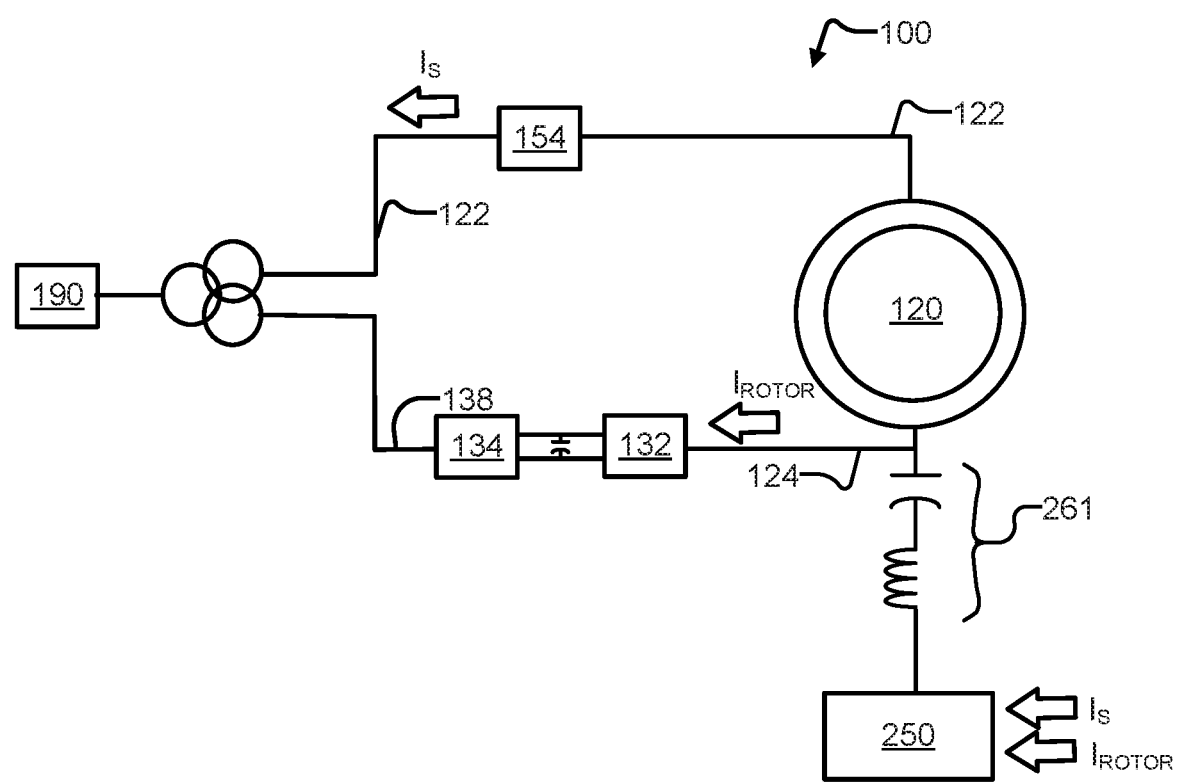
FIG. 12 illustrates an additional example electrical power system including an active filter according to example embodiments of the present disclosure.

According to some embodiments, such as the embodiment shown in FIG. 12, the transformer 260 may be implemented as a series connection of a capacitor and an inductor, illustrated as 261. Thus, the active filter 250 can be a 'hybrid active filter. Hybrid active filter 250 and 261 may have additional technical advantages such as reduced filter size for the same, similar, or equivalent filtering performance relative to other active filters.

Additionally, a passive filter 270 can be provided on the line-side bus 138, such as shown in FIGS. 10 and 11. For instance, the passive filter 270 may be provided between the power converter 130 and the transformer 160 or in other suitable configuration between the power converter 130 and the grid 190. The passive filter 270 may be arranged as an RC filter. The passive filter 270 may include passive components, such as inductors, capacitors, and resistors; that is, components not needing a secondary control signal or power to operate to filter passively. This is in contrast to the active components of the active filter 250.

Additionally, the active filter 250 can also be coupled to the DC link 135, 137, such as shown in FIG. 11, such that the active filter 250 is coupled in parallel across the rotor-side converter 132. The active filter 250 may take as input $I_s$, i.e. the current on the stator bus 122, $I_{ROTOR}$, i.e. the current on the rotor-side bus 124, and/or current and/or voltage of the DC Link 135, 137. The active filter 250 may also be configured to receive at least one electrical condition from at least one of the rotor bus, the line-side converter, the rotor-side converter, the stator bus, the grid interconnection bus, and the DC link. Accordingly, the active filter 250 can be arranged to actively filter harmonics, including those close to the fundamental frequency, to meet grid requirements. It is noted that in circumstances where a hard connection exists between the active filter DC link and the converter DC link, a mechanism for isolation can be used to avoid circulating currents between the bridges of the active filter and the rotor converter e.g., the transformer 260 or alternately a high frequency transformer with power switching devices within 250 on the DC link side.

Figure 13:
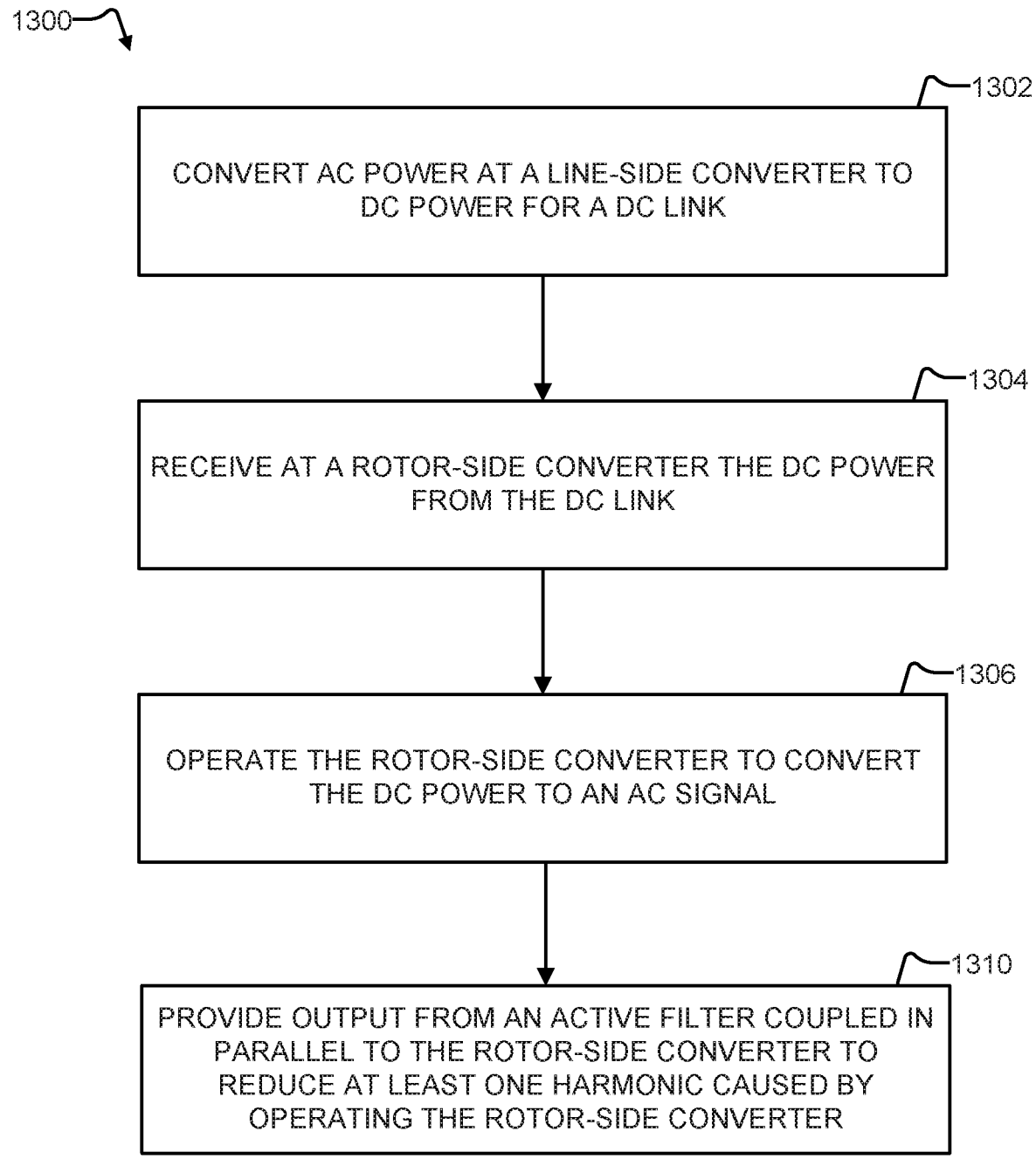
FIG. 13 is a flowchart of an example method of operating an electrical power converter for a doubly fed induction generator system according to example embodiments of the present disclosure.

Referring now to FIG. 13, a flow diagram of one embodiment of a method 1300 for operating a power generation system is illustrated in accordance with aspects of the present subject matter. In general, the method 1300 will be described herein as being implemented using a wind turbine system, such as the DFIG wind turbine system 100 described above with reference to FIG. 2. However, it should be appreciated that the disclosed method 1300 may be implemented using any other suitable power generation system that is configured to supply power for application to a load. In addition, although FIG. 13 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, performed simultaneously, combined and/or adapted in various ways. Additional steps not disclosed herein may be performed without departing from the scope or spirit of the present disclosure.

At (1302), the method 1300 can include converting an AC power at a line-side converter to a DC power for a DC link. For instance, the line-side converter may be part of a power converter, such as the line-side converter 134 of the AC-AC power converter 130 and the DC link may be the DC link 135, 137. The AC power may be three-phase AC power on an AC bus such as the line-side bus 138. The AC power may be converted, for instance, using a plurality of bridge circuits. Other suitable systems for performing AC to DC conversion can be used in accordance with the present method.

At (1304), the method 1300 can include receiving, at a rotor-side converter, the DC power from the DC link. For instance, the rotor-side converter may be the rotor-side converter 132. The DC power may include a DC link voltage, such as across a DC link capacitor. The rotor-side converter may include a plurality of bridge circuits.

At (1306), the method 1300 can include operating the rotor-side converter in an overmodulation regime or close to an overmodulation regime to convert the DC power to an AC signal. For example, the rotor-side converter 132 can be operated according to the overmodulation regime 200 using the converter controller 140. For example, the rotor-side converter 132 can also be operated according to the overmodulation regime 200 with minimized regions 206 (i.e., close to unity overmodulation) using the converter controller 140. For example, the converter controller 140 can provide control signals to the gates of switching elements 142 within the rotor-side converter based on the intersections 208 of a modulating wave 202 and a carrier wave 204, wherein the amplitude of the modulating wave 202 is greater than the amplitude of the carrier wave 204 for the overmodulation regime, or close to the amplitude of the carrier wave 204 for a modulation regime close to the overmodulation regime.

At (1310), the method 1300 includes providing output from an active filter (e.g., active filter 250) coupled in parallel to the rotor-side converter to reduce at least one harmonic caused by operating the rotor side converter in the overmodulation regime or close to the overmodulation regime. For instance, the active filter can be active filter 250 or other suitable active filter. The active filter can be provided on the rotor-side bus 124, coupled in parallel to the rotor-side converter 132, directly coupled to the DC Link 135, 137, or other suitable location. The active filter can provide voltage or current at about the same frequency as the at least one harmonic and at about opposite phase to reduce or cancel the at least one harmonic with minimal or no impact on the power at the fundamental frequency. In some embodiments, a passive filter may be used in addition to the active filter.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An electrical power system connected to a power grid, comprising:
    a generator comprising a stator and a rotor, the stator connected to the power grid via a stator power path;
    a power converter comprising:
    a line-side converter coupled to the power grid via a converter power path; and,
    a rotor-side converter coupled to a rotor bus of the rotor and the line-side converter via a DC link, the rotor-side converter configured to convert a DC power on the DC link to an AC signal for the rotor bus; and,
    an active filter comprising one or more active-controlled components, the active filter being coupled between the generator and the rotor-side converter and in parallel with the rotor-side converter to reduce harmonics caused by operating the rotor-side converter in an overmodulation regime or close to the overmodulation regime by providing current at about the same frequency and amplitude as the harmonics and at an opposite phase.

2. The electrical power system of claim 1, further comprising a controller comprising one or more control devices, the one or more control devices configured to operate the rotor-side converter to provide the AC signal for the rotor bus.

3. The electrical power system of claim 2, wherein the rotor-side converter comprises one or more switching elements, wherein the one or more control devices operate the one or more switching elements in the overmodulation regime.

4. The electrical power system of claim 1, wherein the active-controlled components comprise one or more switching elements.

5. The electrical power system of claim 1, further comprising a passive filter coupled to the converter power path to further reduce the harmonics.

6. The electrical power system of claim 1, wherein the active filter is also coupled to the DC Link.

7. The electrical power system of claim 1, wherein the active filter is configured to receive at least one electrical condition from at least one of the rotor bus, the line-side converter, the rotor-side converter, a stator bus, a grid interconnection bus, and the DC link.

8. The electrical power system of claim 7, wherein the at least one electrical condition is one or more of current and voltage.

9. The electrical power system of claim 1, further comprising a series connection of an inductor and a capacitor coupled between the active filter and the rotor bus.

10. The electrical power system of claim 1, further comprising at least one inductor coupled between the active filter and the rotor bus.

11. The electrical power system of claim 1, wherein the active filter is coupled directly to terminals of the rotor-side converter.

12. A wind turbine system, comprising:
    a generator comprising a stator and a rotor, the stator connected to a power grid via a stator power path;
    a power converter comprising:
    a line-side converter coupled to the power grid via a converter power path; and,
    a rotor-side converter coupled to a rotor bus of the rotor and the line-side converter via a DC link, the rotor-side converter configured to convert a DC power on the DC link to an AC signal for the rotor bus; and,
    an active filter comprising one or more active-controlled electronic components, the active filter being coupled between the generator and the rotor-side converter and in parallel with the rotor-side converter to reduce harmonics caused by operating the rotor-side converter in an overmodulation regime or close to an overmodulation regime by providing current at about the same frequency and amplitude as the harmonics and at an opposite phase.

13. The wind turbine system of claim 12, further comprising a controller comprising one or more control devices, the one or more control devices configured to operate the rotor-side converter to provide the AC signal for the rotor bus.

14. A method of operating an electrical power converter for a doubly fed induction generator system, the method comprising:
    converting an AC power at a line-side converter to a DC power for a DC link;
    receiving at a rotor-side converter the DC power from the DC link;
    operating, using one or more control devices, the rotor-side converter to convert the DC power to an AC signal; and
    operating an active filter coupled between the generator and the rotor-side converter and in parallel to the rotor-side converter to reduce at least one harmonic caused by operating the rotor-side converter in an overmodulation regime or close to an overmodulation regime by providing current at about the same frequency and amplitude as the harmonics and at an opposite phase.

15. The method of claim 14, wherein operating, using the one or more control devices, the rotor-side converter to convert the DC power to the AC signal comprises operating one or more switching elements in the overmodulation regime.

16. The method of claim 15, wherein the active filter comprises one or more active-controlled components.

17. The method of claim 14, further comprising using a passive filter to reduce the at least one harmonic caused by operating the rotor-side converter.

18. The method of claim 14, wherein providing output from the active filter reduces the at least one harmonic caused by operating the rotor-side converter in the overmodulation regime.

19. The method of claim 14, wherein the doubly fed induction generator system is a wind driven doubly fed induction generator system configured to generate electrical power for a power grid.

* * * * *